United States Patent
Hu

(10) Patent No.: US 8,212,407 B2
(45) Date of Patent: Jul. 3, 2012

(54) POWER SUPPLY CIRCUIT

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/578,166

(22) Filed: Oct. 13, 2009

(65) Prior Publication Data

US 2011/0012573 A1    Jan. 20, 2011

(30) Foreign Application Priority Data

Jul. 20, 2009    (CN) .......................... 2009 1 0304545

(51) Int. Cl.
*H02J 1/00*    (2006.01)

(52) U.S. Cl. ......................................................... 307/72
(58) Field of Classification Search ..................... 307/72
See application file for complete search history.

(56) References Cited

U.S. PATENT DOCUMENTS

2008/0282102 A1* 11/2008 Reddy et al. .................. 713/323

* cited by examiner

*Primary Examiner* — Hal Kaplan
(74) *Attorney, Agent, or Firm* — Altis Law Group, Inc.

(57) ABSTRACT

A power supply circuit includes a voltage regulating module; a voltage selecting circuit and a voltage regulating chip. The voltage regulating module outputs corresponding control signals according to a type of a CPU installed on a motherboard. The voltage selecting circuit receives the control signals and converts the corresponding control signal to a voltage selecting signal. The voltage regulating chip receives the voltage selecting signal and outputs the corresponding working voltage to the CPU.

7 Claims, 2 Drawing Sheets

POWER SUPPLY CIRCUIT

BACKGROUND

1. Technical Field

The present disclosure relates to power supply circuits, and particularly to a power supply circuit for a central processing unit (CPU).

2. Description of Related Art

With the rapid development of personal computers, development of high performance components for computers have brought about a corresponding increase in power use. A CPU has a crucial effect on the stability of the computer. A power supply circuit is specially designed for providing power to the CPU. The typical power supply circuit includes a voltage regulating module and a voltage regulating chip. The voltage regulating module outputs a control signal to the voltage regulating chip and the voltage regulating chip outputs different working voltages to the CPU according to different control signals. However, the control signal is asynchronous with an input voltage of the voltage regulating chip and rises slowly from a low voltage level to a high voltage, which commonly causes the power supply circuit to fail.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
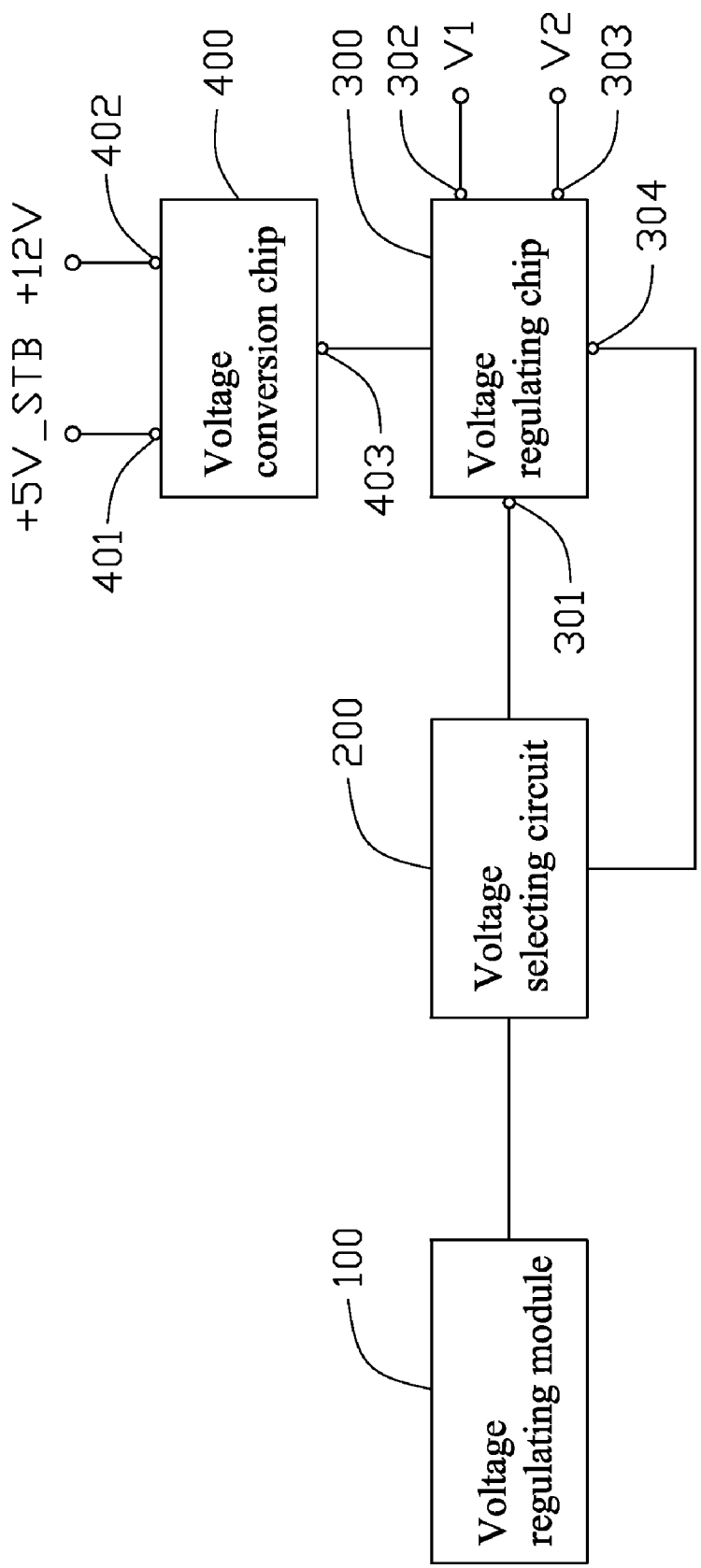
FIG. 1 is a block diagram of a power supply circuit, in accordance with an embodiment.
Figure 2:
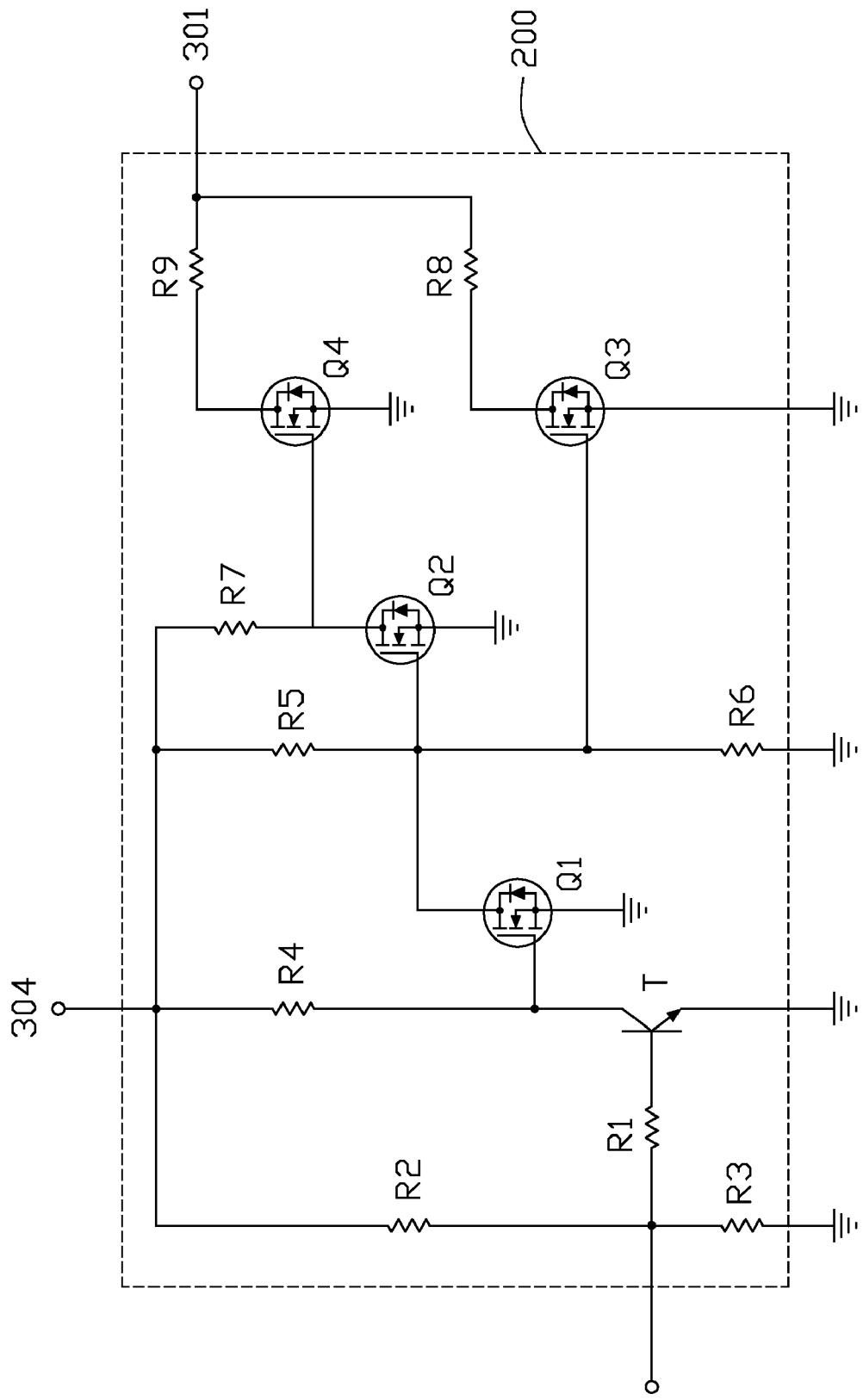
FIG. 2 is a circuit diagram of a voltage selecting circuit of FIG. 1.

Referring to FIGS. 1 and 2, a power supply circuit for a CPU (not shown) that on a motherboard (not shown) includes a voltage regulating module 100, a voltage selecting circuit 200, a voltage regulating chip 300, and a voltage conversion chip 400. The voltage regulating module 100 outputs a corresponding control signal according to a type of the CPU installed on the motherboard (not shown). The voltage selecting circuit 200 receives the control signal, and converts the corresponding control signal to a voltage selecting signal. The voltage regulating chip 300 receives the voltage selecting signal and outputs the corresponding working voltage to the CPU (not shown).

The voltage regulating chip 300 has a selecting signal input terminal 301, a first voltage output terminal 302, a second voltage output terminal 303, and a third voltage output terminal 304. The voltage regulating chip 300 either outputs a first voltage V1 from the first voltage output terminal 302 or a second voltage V2 from the second voltage output terminal 303 to provide a working voltage to the CPU according to the different voltage selecting signals.

The voltage conversion chip 400 has a first voltage input terminal 401, a second voltage input terminal 402, and an output terminal 403. The voltage conversion chip 400 receives a third voltage and a fourth voltage at the first and second voltage input terminals 401, 402 respectively from a power supply (not shown) on the motherboard (not shown), and outputs a fifth voltage at the output terminal 403 to provide power to the voltage regulating chip 300. The voltage regulating chip 300 outputs the fifth voltage from the third voltage output terminal 304 to provide power to the voltage selecting circuit 200. The third voltage is a +5 volts standby voltage, the fourth voltage is +12 volts, the fifth voltage is +3.3 volts.

Referring to FIG. 2, the voltage selecting circuit 200 includes a transistor T, a first MOSFET Q1, a second MOSFET Q2, a third MOSFET Q3, and a fourth MOSFET Q4. The transistor T base is configured for receiving the control signals via a first resistor R1. The transistor T base is electrically coupled to the third voltage output terminal 304 via a second resistor R2, and is grounded via a third resistor R3. The transistor T collector is electrically coupled to the first MOSFET Q1 gate, and is electrically coupled to the third voltage output terminal 304 via a fourth resistor R4. The transistor T emitter is grounded. The first MOSFET Q1 drain is electrically coupled to the second and third MOSFETs Q2, Q3 gates. The first MOSFET Q1 drain is electrically coupled to the third voltage output terminal 304 via a fifth resistor R5, and is grounded via a sixth resistor R6. The second MOSFET Q2 drain is electrically coupled to the fourth MOSFET Q4 gate, and is electrically coupled to the third voltage output terminal 304 via a seventh resistor R7. The third and fourth MOSFETs Q3, Q4 drains are electrically coupled to the selecting signal input terminal 301 via an eighth resistor R8 and a ninth resistor R9 respectively. The MOSFETs Q1~Q4 sources are grounded. The transistor T is a NPN type transistor. The MOSFETs Q1~Q4 are N-channel MOSFETs.

In use, when the voltage regulating module 100 outputs a high voltage level control signal, the transistor T base is at a high voltage level and turns on. The first MOSFET Q1 gate is at a low voltage level and turns off. The second and third MOSFETs Q2, Q3 gates are at a high voltage level and turn on. The fourth MOSFET Q4 gate is at a low voltage level and turns off. The voltage selecting circuit 200 outputs a first voltage selecting signal to the selecting signal input terminal 301 via the eighth resistor R8. The voltage regulating chip 300 receives the first voltage selecting signal, and outputs the corresponding working voltage to the CPU (not shown). When the voltage regulating module 100 outputs a low voltage level control signal, the transistor T base is at a low voltage level and turns off. The first MOSFET Q1 gate is at a high voltage level and turns on. The second and third MOSFETs Q2, Q3 gates are at a low voltage level and turn off. The fourth MOSFET Q4 gate is at a high voltage level and turns on. The voltage selecting circuit 200 outputs a second voltage selecting signal to the selecting signal input terminal 301 via the ninth resistor R9.

The voltage regulating chip 300 receives the second voltage selecting signal, and outputs the corresponding working voltage to the CPU (not shown). The resistances of the eighth and ninth resistors R8, R9 are different, and amounts of current flowing through the eighth and ninth resistors R8, R9 are different. The voltage regulating chip 300 is capable of recognizing the first and second voltage selecting signals according to the current flowing through the eighth and ninth resistors R8, R9. The voltage selecting circuit 200 converts the corresponding control signal to a voltage selecting signal by the transistor T and the MOSFETs Q1~Q4. The MOSFETs Q1~Q4 have a high response speed, thereby precision of the voltage selecting signals output by the voltage selecting circuit 200 is largely improved. The control signals output by the voltage regulating module 100 is pulled up to the 3.3 volts fifth voltage, and precision of the control signals is further improved. Thereby, circuit failure is avoided.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit, comprising:
   a voltage regulating module capable of outputting control signals; wherein the control signals are related to a type of a CPU installed on a motherboard;
   a voltage selecting circuit capable of receiving the control signals and converting each of the control signals to a voltage selecting signal; and
   a voltage regulating chip capable of receiving the voltage selecting signal and outputting a working voltage to the CPU; wherein the voltage regulating chip has a selecting signal input terminal, at least a first voltage output terminal and a second voltage output terminal; the selecting signal input terminal is configured for receiving the voltage selecting signal, and the voltage regulating chip outputs a first voltage at the first voltage output terminal or a second voltage at the second voltage output terminal to provide working voltage according to the different voltage selecting signals.

2. The power supply circuit of claim 1, further comprising a voltage conversion chip, the voltage conversion chip has a first voltage input terminal; a second voltage input terminal and an output terminal; the voltage conversion chip is capable of receiving a third voltage and a fourth voltage at the first and second voltage input terminals respectively from a power supply; the voltage conversion chip is capable of outputting a fifth voltage at the output terminal and providing power to the voltage regulating chip; the voltage regulating chip further comprises a third voltage output terminal, and the voltage regulating chip is capable of outputting the fifth voltage to the voltage selecting circuit at the third voltage output terminal.

3. The power supply circuit of claim 2, wherein the third voltage is a +5 volts standby voltage, the fourth voltage is a +12 volts voltage, the fifth voltage is a +3.3 volts voltage.

4. The power supply circuit of claim 2, wherein the voltage selecting circuit comprises a transistor; a first MOSFET; a second MOSFET; a third MOSFET and a fourth MOSFET; the transistor base is configured for receiving the control signals via a first resistor; the transistor base is electrically coupled to the third voltage output terminal via a second resistor and is grounded via a third resistor; the transistor collector is electrically coupled to the first MOSFET gate and is electrically coupled to the third voltage output terminal via a fourth resistor; and the transistor emitter is grounded.

5. The power supply circuit of claim 4, wherein the first MOSFET drain is electrically coupled to the second and third MOSFET gates; the first MOSFET drain is electrically coupled to the third voltage output terminal via a fifth resistor and is grounded via a sixth resistor; the second MOSFET drain is electrically coupled to the fourth MOSFET gate and is electrically coupled to the third voltage output terminal via a seventh resistor; the third and fourth MOSFETs drains are electrically coupled to the selecting signal input terminal via a eighth resistor and a ninth resistor respectively; and the first MOSFET, the second MOSFET, the third MOSFET, and the fourth MOSFET sources are grounded.

6. The power supply circuit of claim 5, wherein resistances of the eighth and ninth resistors are different.

7. The power supply circuit of claim 5, wherein the transistor is a NPN type transistor; and the first MOSFET, the second MOSFET, the third MOSFET and the fourth MOSFET are N-channel MOSFETs.

* * * * *